(12) United States Patent
Chen et al.

(10) Patent No.: US 11,799,506 B2
(45) Date of Patent: Oct. 24, 2023

(54) RECEIVER APPARATUS AND MOBILE DEVICE

(71) Applicant: VIVO MOBILE COMMUNICATION CO., LTD., Guangdong (CN)

(72) Inventors: Jie Chen, Chang'an Dongguan (CN); Haile Long, Chang'an Dongguan (CN); Hailiang Wang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 343 days.

(21) Appl. No.: 17/321,392

(22) Filed: May 14, 2021

(65) Prior Publication Data

US 2021/0273669 A1    Sep. 2, 2021

Related U.S. Application Data

(63) Continuation of application No. PCT/CN2019/116122, filed on Nov. 7, 2019.

(30) Foreign Application Priority Data

Nov. 15, 2018 (CN) .......................... 201811358285.0

(51) Int. Cl.
*H04R 1/34* (2006.01)
*H04B 1/16* (2006.01)
*H04R 1/02* (2006.01)

(52) U.S. Cl.
CPC .............. *H04B 1/16* (2013.01); *H04R 1/025* (2013.01); *H04R 1/345* (2013.01); *H04R 2400/11* (2013.01); *H04R 2499/11* (2013.01)

(58) Field of Classification Search
CPC .......... H04B 1/16; H04R 1/025; H04R 1/345; H04R 1/02; H04R 1/34; H04R 2400/11; H04R 2499/11
See application file for complete search history.

(56) References Cited

U.S. PATENT DOCUMENTS

2011/0154396 A1    6/2011    Kim et al.
2014/0119592 A1    5/2014    Choi et al.
(Continued)

FOREIGN PATENT DOCUMENTS

CN    1340987 A    3/2002
CN    1568070 A    1/2005
(Continued)

OTHER PUBLICATIONS

Extended European Search Report dated Dec. 7, 2021 as received in Application No. 19884195.9.
(Continued)

*Primary Examiner* — Tuan H Nguyen
(74) *Attorney, Agent, or Firm* — Maschoff Brennan

(57) ABSTRACT

This disclosure discloses a receiver apparatus and a mobile device. The receiver apparatus includes a two-way receiver and an acoustic chamber support. The two-way receiver has a first sound output region and a second sound output region. The acoustic chamber support has an acoustic chamber, and the two-way receiver is provided in the acoustic chamber. The acoustic chamber support has a first sound outlet and a second sound outlet that both communicate with the acoustic chamber, where the first sound outlet and the second sound outlet are opposite each other, the first sound outlet communicates with the first sound output region, and the second sound outlet communicates with the second sound output region. The mobile device uses the receiver apparatus.

19 Claims, 6 Drawing Sheets

(56) References Cited

U.S. PATENT DOCUMENTS

| | | |
|---|---|---|
| 2019/0098121 A1 | 3/2019 | Jeon et al. |
| 2021/0274289 A1 | 9/2021 | Wang et al. |

FOREIGN PATENT DOCUMENTS

| | | | |
|---|---|---|---|
| CN | 1783910 | A | 6/2006 |
| CN | 1941809 | A | 4/2007 |
| CN | 201893826 | U | 7/2011 |
| CN | 201937660 | U | 8/2011 |
| CN | 103781001 | A | 5/2014 |
| CN | 204465855 | U | 7/2015 |
| CN | 105227719 | A | 1/2016 |
| CN | 108390972 | A | 8/2018 |
| CN | 108566597 | A | 9/2018 |
| CN | 108566605 | A | 9/2018 |
| CN | 108566606 | A | 9/2018 |
| CN | 108632727 | A | 10/2018 |
| CN | 108924313 | A | 11/2018 |
| CN | 109511029 | A | 3/2019 |
| KR | 10-1880465 | B1 | 7/2018 |

OTHER PUBLICATIONS

CN Office Action dated Oct. 8, 2019 as received in Application No. 201811358285.0.
CN Office Action dated Aug. 4, 2021 as received in Application No. 201811358285.0.
International Search Report and Written Opinion of the ISA dated May 27, 2021 as received in Application No. PCT/CN2019/116122.

RECEIVER APPARATUS AND MOBILE DEVICE

CROSS-REFERENCE TO RELATED APPLICATIONS

This application is a continuation of PCT Application No. PCT/CN2019/116122 filed on Nov. 7, 2019, which claims priority to Chinese Patent Application No. 201811358285.0, filed in China on Nov. 15, 2018, which is incorporated herein by reference in its entirety.

TECHNICAL FIELD

This disclosure relates to the field of mobile devices, and in particular, to a receiver apparatus and a mobile device.

BACKGROUND

With rapid development of material technologies and communication technologies, mobile devices with novel appearances or using special materials continue to emerge, and mobile devices with front and rear screens are also one of future trends. A mobile device with double-sided screens is provided with two screens at the front and the back. This compresses space of the mobile device in a thickness direction. Such a mobile device with front and rear screens must be provided with sound output components on both the front and the back. Because the space of the mobile device in the thickness direction is compressed by the front and rear screens, a sound output structure of a receiver in conventional technologies cannot be applied to the mobile device with front and rear screens. Therefore, the mobile device with front and rear screens cannot achieve simultaneous sound output at the two screens.

SUMMARY

Embodiments of this disclosure provide a receiver apparatus and a mobile device to resolve the problem that a mobile device with front and rear screens in conventional technologies cannot achieve simultaneous sound output at the two screens.

In order to resolve the foregoing technical problem, this disclosure is implemented as follows:

According to a first aspect, a receiver apparatus is provided. The receiver apparatus includes a two-way receiver and an acoustic chamber support, where the two-way receiver has a first sound output region and a second sound output region, and the acoustic chamber support has an acoustic chamber, where the two-way receiver is provided in the acoustic chamber, and the acoustic chamber support has a first sound outlet and a second sound outlet that both communicate with the acoustic chamber, where the first sound outlet and the second sound outlet are opposite each other, the first sound outlet communicates with the first sound output region, and the second sound outlet communicates with the second sound output region.

According to a second aspect, a mobile device using the receiver apparatus according to the first aspect is provided.

In the embodiments of this disclosure, the receiver apparatus achieves two-way sound output through provision of the two-way sound output receiver, and the acoustic chamber support encloses the two-way sound output receiver to improve a sound output effect of the receiver apparatus. The mobile device uses the receiver apparatus provided in this disclosure to achieve simultaneous sound output at two screens.

BRIEF DESCRIPTION OF DRAWINGS

The drawings described herein are used to provide a further understanding of this disclosure, and constitute a part of this disclosure. Exemplary embodiments of this disclosure and descriptions thereof are used to explain this disclosure, but do not constitute any inappropriate limitation on this disclosure. In the drawings.

DESCRIPTION OF EMBODIMENTS

The following clearly describes the technical solutions in the embodiments of this disclosure with reference to the accompanying drawings in the embodiments of this disclosure. Apparently, the described embodiments are merely a part rather than all of the embodiments of this disclosure. All other embodiments that a person of ordinary skill in the art obtains without creative efforts based on the embodiments of this disclosure shall fall within the protection scope of this disclosure.

Figure 1:
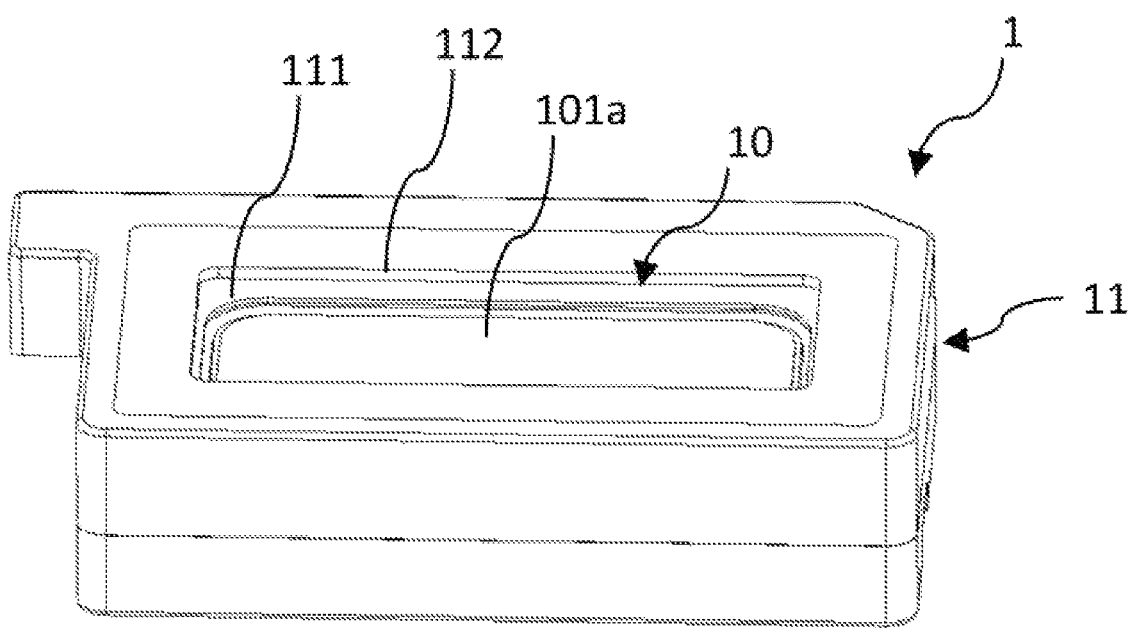
FIG. 1 is a three-dimensional diagram of a receiver apparatus according to a first embodiment of this disclosure.
Figure 2:
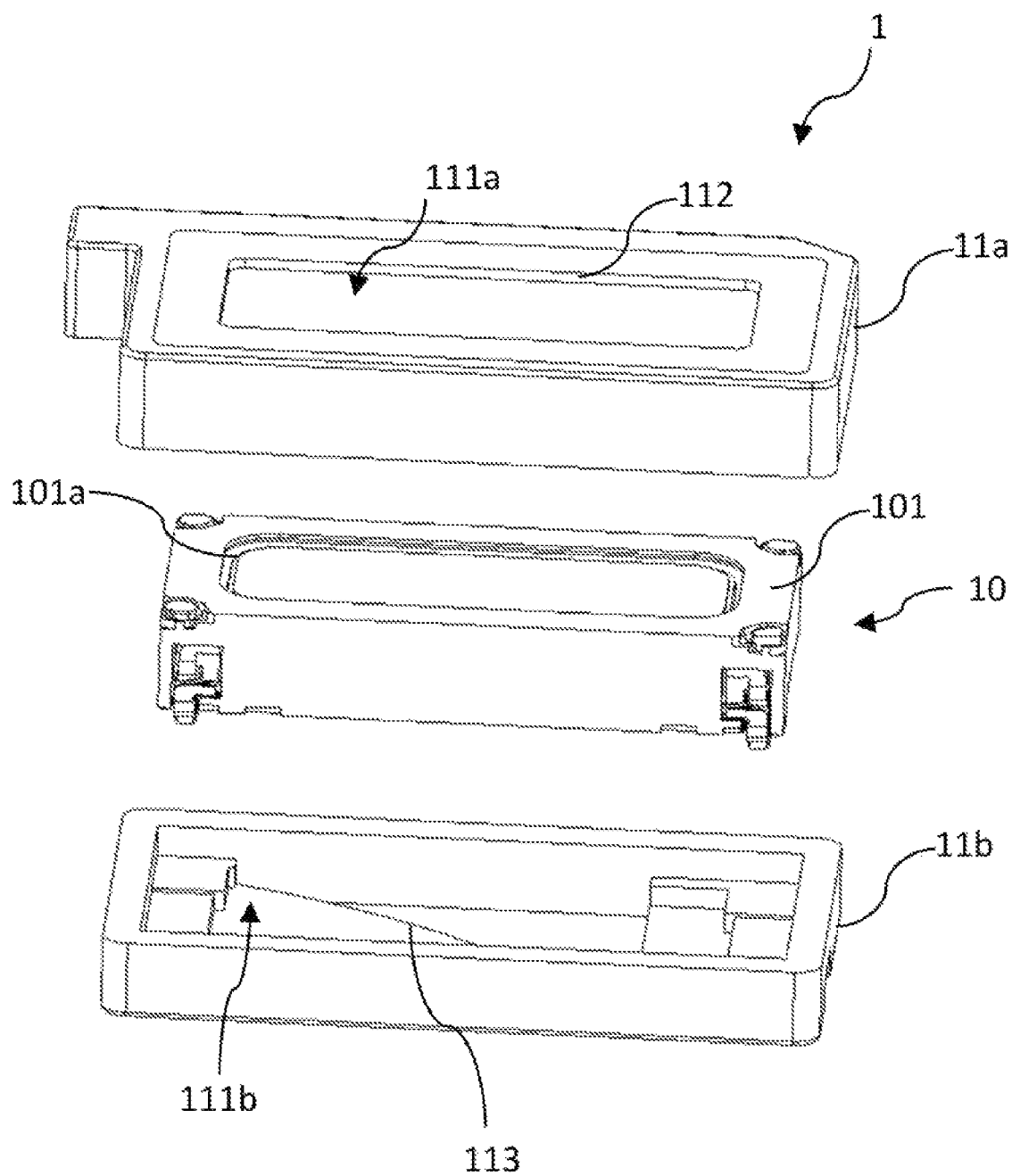
FIG. 2 is a schematic exploded view of the receiver apparatus according to the first embodiment of this disclosure.
Figure 3:
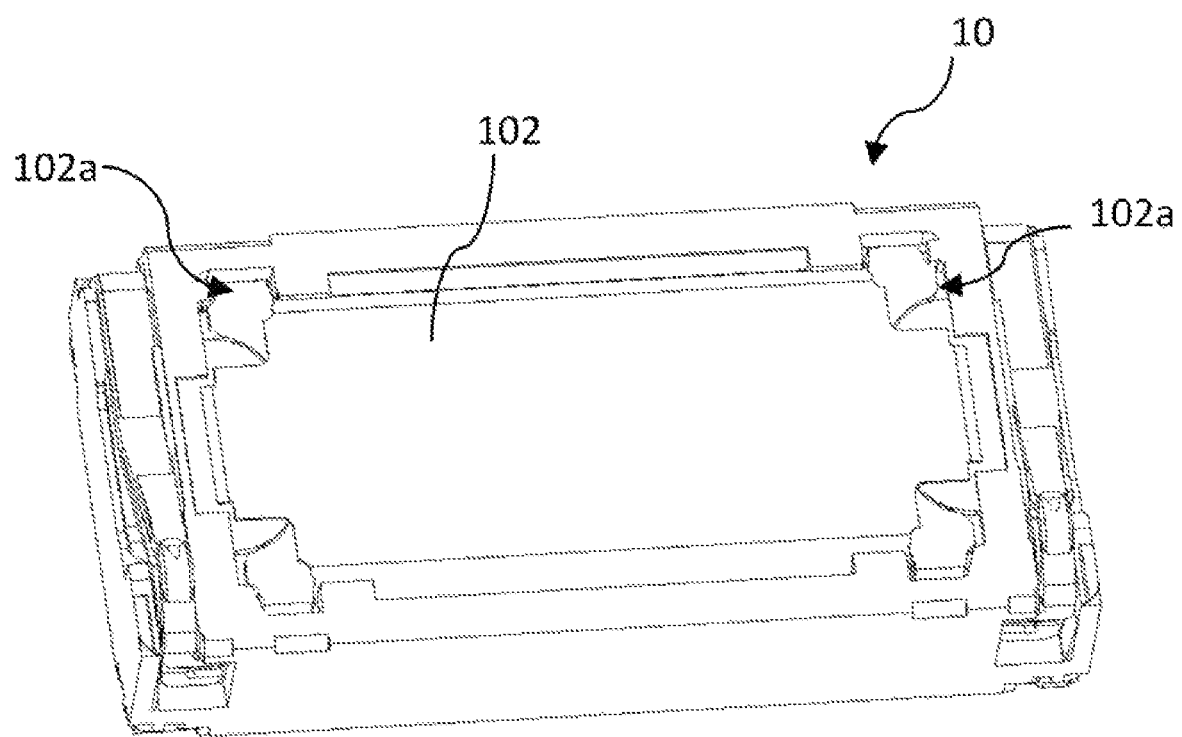
FIG. 3 is a schematic diagram of a two-way receiver according to the first embodiment of this disclosure.

FIG. 1, FIG. 2, and FIG. 3 are a three-dimensional diagram, a schematic exploded view, and a schematic diagram of a two-way receiver, respectively, of a receiver apparatus according to a first embodiment of this disclosure. As shown in the figures, this embodiment provides a receiver apparatus 1. The receiver apparatus 1 includes a two-way receiver 10 and an acoustic chamber support 11. The two-way receiver 10 has a first sound output surface 101 and a second sound output surface 102, and the first sound output surface 101 and the second sound output surface 102 are opposite each other. The first sound output surface 101 has a first sound output region 101a, the second sound output surface 102 has a second sound output region 102a, and the first sound output region 101a and the second sound output region 102a are staggered, so that the two-way receiver 10 can achieve two-way sound output. In this embodiment, the first sound output region 101a is located at the center of the first sound output surface 101, and two second sound output regions 102a are provided that are located at a first edge and a second edge of the second sound output surface 102. The first edge and the second edge are opposite each other, so the two second sound output regions 102a and the first sound output region 101a are staggered. Obviously, an area of the first sound output region 101a is larger than an area of the two second sound output regions 102a. When one second sound output region 102a is provided, the second sound output region 102a can be located at the periphery of the second sound output surface 102, so that the second sound output region 102a and the first sound output region 101a are staggered. In this embodiment, the first sound output region 101a and the second sound output region 102a are staggered to mainly improve a sound output effect of the two-way receiver 10. Certainly, the first sound output region 101a and the second sound output region 102a may be aligned, which is not further described herein.

The acoustic chamber support 11 has an acoustic chamber 111, and the two-way receiver 10 is provided in the acoustic chamber 111. The acoustic chamber support 11 has a first sound outlet 112 in a surface corresponding to the first sound output surface 101 of the two-way receiver 10, and the acoustic chamber support 11 has a second sound outlet 113 in a surface corresponding to the second sound output surface 102 of the two-way receiver 10. The first sound outlet 112 and the second sound outlet 113 are opposite each other and both communicate with the acoustic chamber 111. A first sound source emitted from the first sound output region 101a is output from the first sound outlet 112, and a second sound source emitted from the second sound output region 102a is output from the second sound outlet 113. An output direction of the first sound source is different from that of the second sound source, so that the receiver apparatus 1 in this embodiment achieves two-way sound output.

Optionally, the acoustic chamber support 11 in this embodiment includes a first acoustic chamber support 11a and a second acoustic chamber support 11b. The first acoustic chamber support 11a has a first acoustic chamber 111a, and the second acoustic chamber support 11b has a second acoustic chamber 111b. The first sound outlet 112 is provided at the first acoustic chamber support 11a and communicates with the first acoustic chamber 111a. The second sound outlet 113 is provided at the second acoustic chamber support 11b and communicates with the second acoustic chamber 111b. The second acoustic chamber support 11b is connected to the first acoustic chamber support 11a, the second sound outlet 113 is opposite the first sound outlet 112, and the first acoustic chamber 111a and the second acoustic chamber 111b are in communication with each other and jointly form the acoustic chamber 111 accommodating the receiver 10. The first acoustic chamber support 11a and the second acoustic chamber support 11b are detachably connected.

When the first sound source is emitted from the first sound output region 101a and the second sound source is emitted from the second sound output region 102a, the first sound source or the second sound source propagates in the acoustic chamber 111, so that the first sound source or the second sound source generates a high-band cutoff frequency and a high-frequency peak, to correct high-frequency noise of the first sound source or the second sound source, increase an intermediate frequency of the first sound source or the second sound source to reduce the high-frequency noise, reduce high band extension, and improve conversion efficiency of the first sound source or the second sound source. In other words, the first sound source or the second sound source is improved by the acoustic chamber 111, and the improved first sound source or second sound source is output through the first sound outlet 112 or the second sound outlet 113, thereby effectively improving a sound output effect of the receiver apparatus 1.

Figure 4:
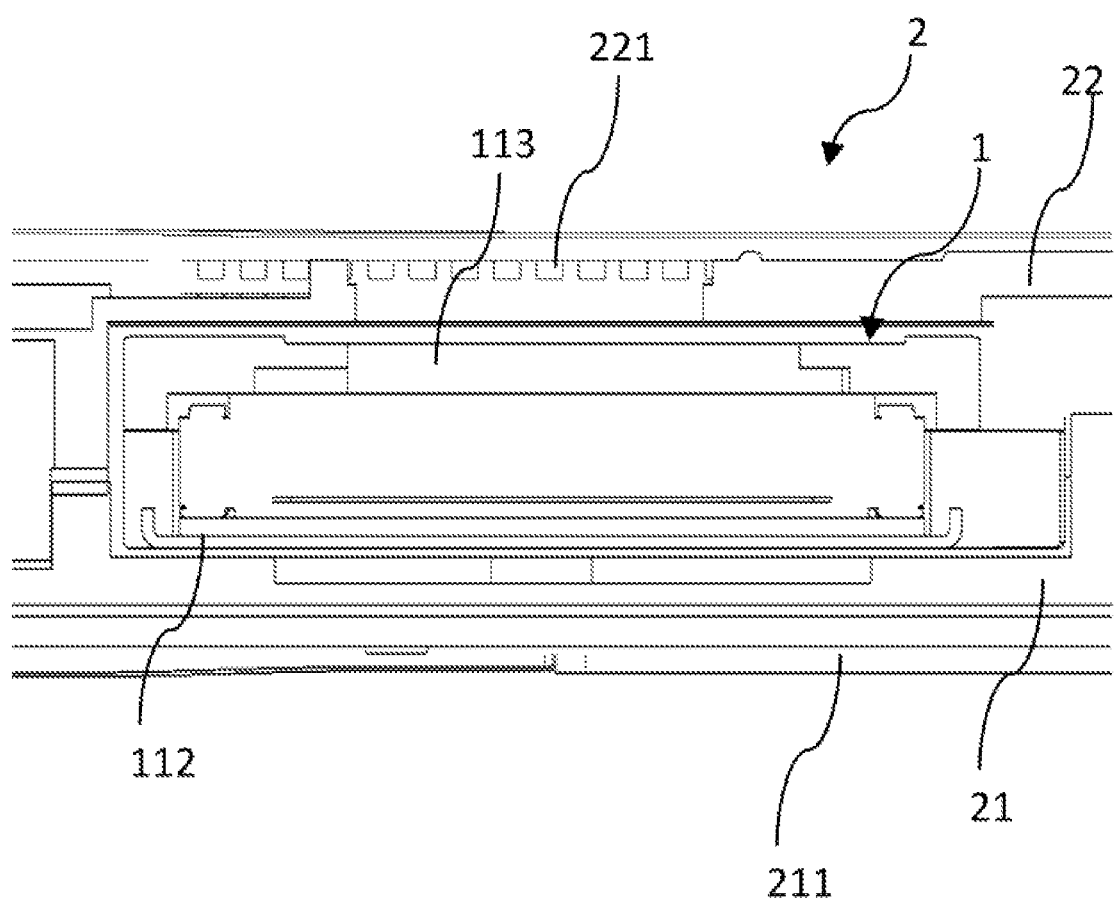
FIG. 4 is a cross-sectional view of a mobile device according to a second embodiment of this disclosure.
Figure 5:
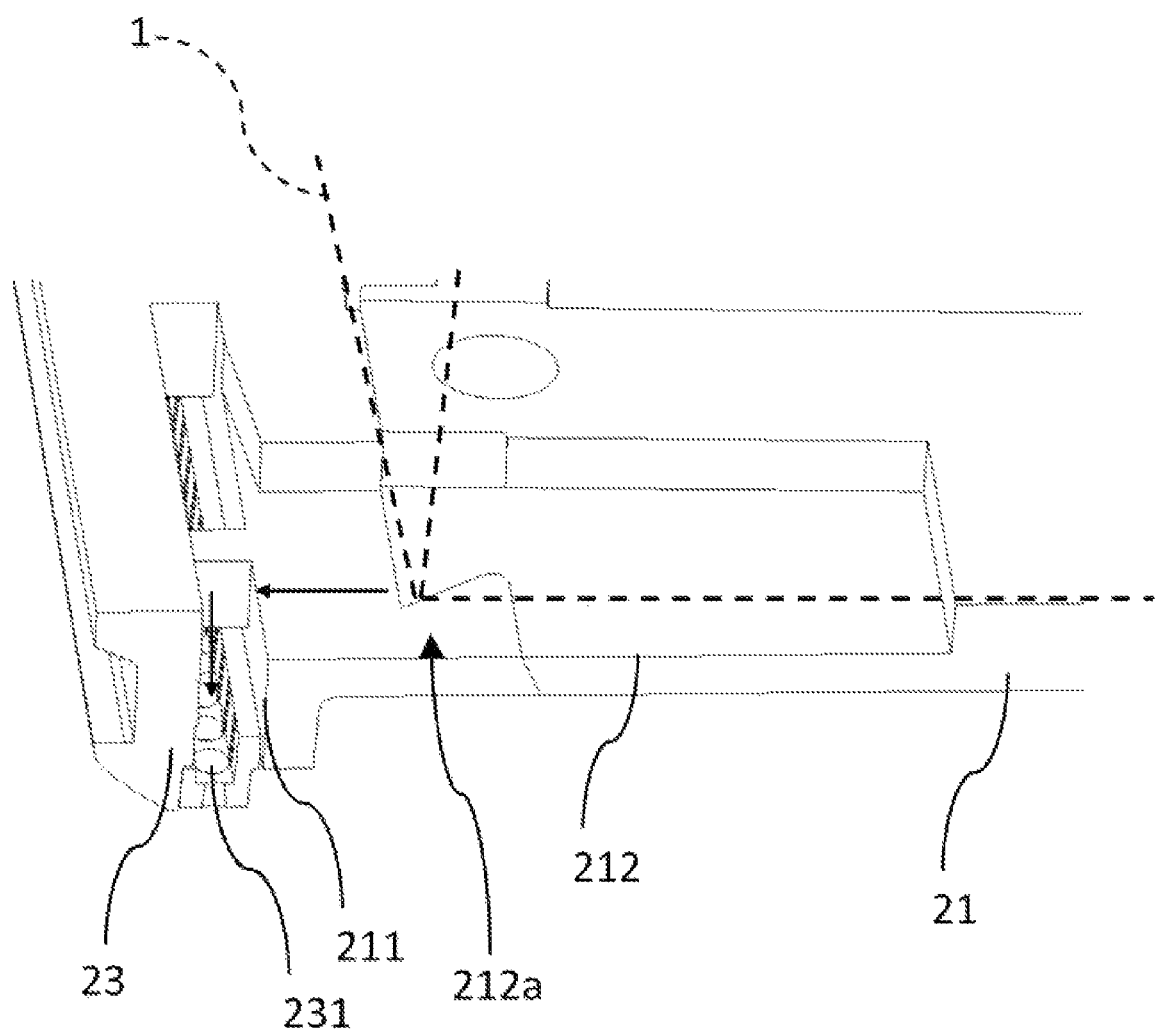
FIG. 5 is a partial cross-sectional view of a main board cover according to the second embodiment of this disclosure.
Figure 6:
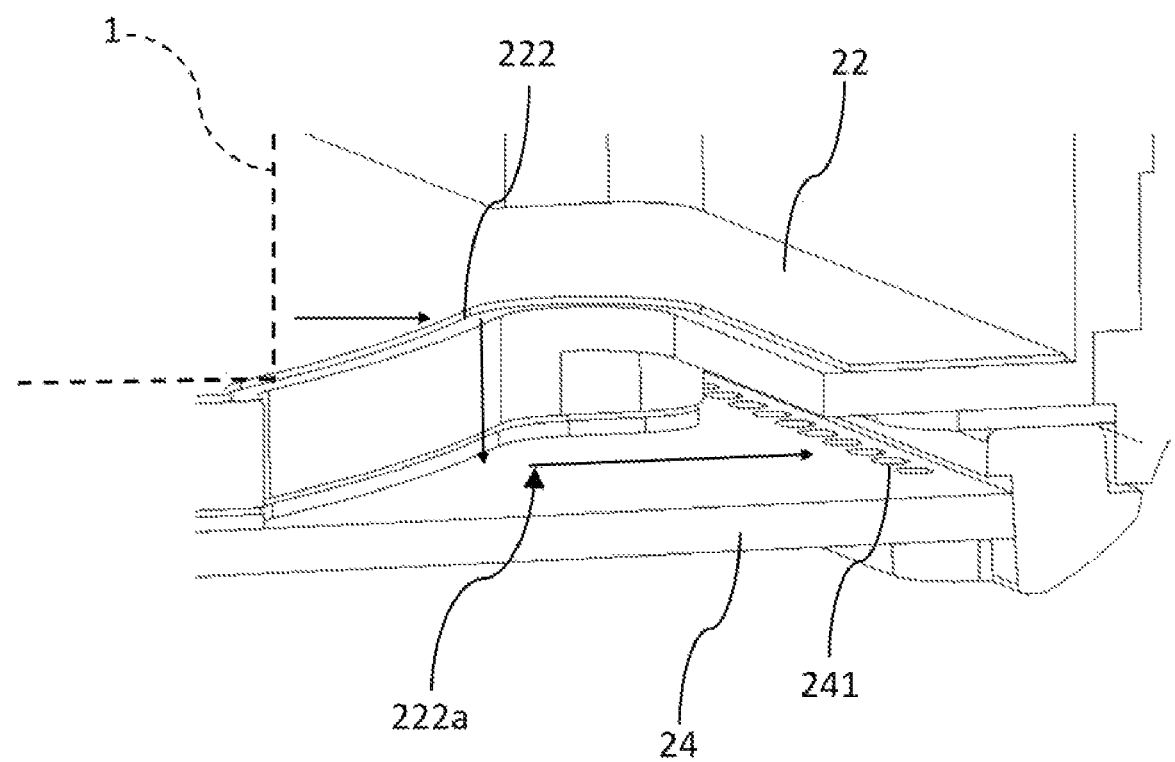
FIG. 6 is a partial cross-sectional view of a middle frame according to the second embodiment of this disclosure.

FIG. 4, FIG. 5, and FIG. 6 are a cross-sectional view, a partial cross-sectional view of a main board cover, and a partial cross-sectional view of a middle frame, respectively, of a mobile device according to a second embodiment of this disclosure. As shown in the figures, the receiver apparatus 1 according to the first embodiment is applied to a mobile device 2 in this embodiment, and the mobile device 2 may be a mobile phone or a tablet computer. The mobile device 2 in this embodiment includes a main board cover 21 and a middle frame 22. The receiver apparatus 1 is provided between the main board cover 21 and the middle frame 22. The main board cover 21 is located on a surface of the receiver apparatus 1, where a first sound outlet 112 is provided in this surface. The middle frame 22 is located on a surface of the receiver apparatus 1, where a second sound outlet 113 is provided in this surface. The main board cover 21 has a first sound output hole 211 on one side. The first sound output hole 211 communicates with the first sound outlet 112 of the receiver apparatus 1, so that a first sound source emitted by the first sound outlet 112 is output from the first sound output hole 211. The middle frame 22 has a second sound output hole 221 on one side, and the second sound output hole 221 communicates with the second sound outlet 113 of the receiver apparatus 1, so that a second sound source emitted by the second sound outlet 113 is output from the second sound output hole 221. A propagation direction of the first sound source emitted from the first sound output hole 211 is different from a propagation direction of the second sound source emitted from the second sound output hole 221, so that the mobile device 2 achieves two-way sound output.

Optionally, the first sound output hole 211 and the second sound output hole 221 in this embodiment are opposite each other. Certainly, the first sound output hole 211 and the second sound output hole 221 may not be opposite each other, provided that the first sound output hole 211 communicates with the first sound outlet 112 and the second sound output hole 221 communicates with the second sound outlet 113, to allow the first sound source to come out from the first sound output hole 211, and the second sound source from the second sound output hole 221. Certainly, alternatively, the first sound output hole 211 may communicate with the second sound outlet 113, and the second sound output hole 221 may communicate with the first sound outlet 112. Details are not described herein.

Optionally, the first sound output hole 211 and the first sound outlet 112 in this embodiment are communicated through a first groove 212 of the main board cover 21. One end of the first groove 212 is located on a surface of the receiver apparatus 1, where the first sound outlet 112 is provided in this surface. The first sound output hole 211 is provided at the other end of the first groove 212. A first sound source propagation channel 212a is provided in the first groove 212. Both the first sound outlet 112 and the first sound output hole 211 communicate with the first sound source propagation channel 212a. A first sound source emitted by the first sound outlet 112 propagates along the first sound source propagation channel 212a to the first sound output hole 211, so that the first sound source is output from the first sound output hole 211.

Optionally, the second sound output hole 221 and the second sound outlet 113 in this embodiment are communicated through a second groove 222 of the middle frame 22. One end of the second groove 222 is located on a surface of the receiver apparatus 1, where the second sound outlet 113 is provided in this surface, and the second sound output hole 221 is provided at the other end of the second groove 222. A second sound source propagation channel 222a is provided in the second groove 222. Both the second sound outlet 113 and the second sound output hole 221 communicate with the second sound source propagation channel 222a, and a second sound source emitted by the second sound outlet 113 propagates along the second sound source propagation channel 222a to the second sound output hole 221, so that the second sound source is output from the second sound output hole 221.

Furthermore, cross-sectional shapes of the first groove 212 and the second groove 222 in this embodiment are L-shaped. Therefore, a propagation path of the first sound source along the first sound source propagation channel 212a and a propagation path of the second sound source along the second sound source propagation channel 222a are also L-shaped. This is only one embodiment of this disclosure. The cross-sectional shapes of the first groove 212 and the second groove 222 may be determined based on internal configuration of the mobile device 2. Details are not described herein.

Optionally, in this embodiment, one or more first sound output holes 211 and one or more second sound output holes 221 may be provided, and these quantities are determined as required by a user. Details are not described herein.

Optionally, the mobile device 2 in this embodiment further includes a first decorative hood 23 and a second decorative hood 24. The first decorative hood 23 is provided on one side of the main board cover 21 and is provided above the first sound output hole 211 of the main board cover 21. The first decorative hood 23 has a plurality of first holes 231 communicating with the first sound output hole 211, so that the first sound output hole 211 and the first sound outlet 112 are communicated with each other through the plurality of first holes 231. The second decorative hood 24 is provided on one side of the middle frame 22 and is provided above the second sound output hole 221 of the middle frame 22. The second decorative hood 24 has a plurality of second holes 241 communicating with the second sound output hole 221, so that the second sound output hole 221 and the second sound outlet 113 are communicated with each other through the plurality of second holes 241. The first decorative hood 23 and the second decorative hood 24 is mainly intended to prevent dust or foreign objects outside the mobile device 2 from entering the mobile device 2 through the first sound output hole 211 and the second sound output hole 221. The first decorative hood 23 in this embodiment is provided at the other end of the first groove 212. The second decorative hood 24 serves as a bottom of the second groove 222, and forms the second groove 222 together with a through-groove running through the middle frame 22.

In conclusion, this disclosure provides a receiver apparatus and a mobile device. The receiver apparatus achieves two-way sound output through provision of the two-way sound output receiver, and the acoustic chamber support encloses the two-way sound output receiver to improve a sound output effect of the receiver apparatus. The mobile device uses the receiver apparatus provided in this disclosure to achieve simultaneous sound output at two screens, and saves space of the mobile device, so that the mobile device can still be light and thin, thereby reducing overall costs.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

What is claimed is:

1. A receiver apparatus, comprising a two-way receiver and an acoustic chamber support, wherein the two-way receiver has a first sound output region and a second sound output region, and the acoustic chamber support has an acoustic chamber, wherein the two-way receiver is provided in the acoustic chamber, and the acoustic chamber support has a first sound outlet and a second sound outlet that both communicate with the acoustic chamber, wherein the first sound outlet and the second sound outlet are opposite each other, the first sound outlet communicates with the first sound output region, and the second sound outlet communicates with the second sound output region, wherein the first sound output region is located at the center of a first sound output surface of the two-way receiver, and the second sound output region is located at the periphery of a second sound output surface of the two-way receiver, wherein the first sound output surface and the second sound output surface are opposite each other, and the first sound output region and the second sound output region are staggered.

2. The receiver apparatus according to claim 1, wherein two second sound output regions are provided, the two second sound output regions are located at a first edge and a second edge of the second sound output surface, and the first edge and the second edge are opposite each other.

3. A mobile device, comprising the receiver apparatus according to claim 2.

4. The mobile device according to claim 3, wherein the mobile device has a main board cover and a middle frame, the two-way sound output receiver apparatus is provided between the main board cover and the middle frame, one of the first sound outlet and the second sound outlet communicates with a first sound output hole of the main board cover, and the other of the first sound outlet and the second sound outlet communicates with a second sound output hole of the middle frame.

5. The mobile device according to claim 4, wherein the first sound outlet communicates with the first sound output hole, the second sound outlet communicates with the second sound output hole, the main board cover has a first groove on one side, the first sound outlet is located at one end of the first groove, the first sound output hole is located at the other end of the first groove, and the first sound outlet and the first sound output hole are communicated through a first sound source propagation channel of the first groove.

6. The receiver apparatus according to claim 1, wherein the acoustic chamber support comprises a first acoustic chamber support and a second acoustic chamber support connected to the first acoustic chamber support, the first acoustic chamber support has a first acoustic chamber and the first sound outlet communicating with the first acoustic chamber, the second acoustic chamber support has a second acoustic chamber and the second sound outlet communicating with the second acoustic chamber, and the first acoustic chamber and the second acoustic chamber are in communication with each other and together form the acoustic chamber.

7. The receiver apparatus according to claim 6, wherein the first acoustic chamber support and the second acoustic chamber support are detachably connected.

8. A mobile device, comprising the receiver apparatus according to claim 6.

9. The mobile device according to claim 8, wherein the mobile device has a main board cover and a middle frame, the two-way sound output receiver apparatus is provided between the main board cover and the middle frame, one of the first sound outlet and the second sound outlet communicates with a first sound output hole of the main board cover, and the other of the first sound outlet and the second sound outlet communicates with a second sound output hole of the middle frame.

10. The mobile device according to claim 9, wherein the first sound outlet communicates with the first sound output hole, the second sound outlet communicates with the second sound output hole, the main board cover has a first groove on one side, the first sound outlet is located at one end of the first groove, the first sound output hole is located at the other end of the first groove, and the first sound outlet and the first sound output hole are communicated through a first sound source propagation channel of the first groove.

11. The mobile device according to claim 10, further comprising a first decorative hood, wherein the first decorative hood is provided on one side of the main board cover and located above the first sound output hole, and has a plurality of first holes communicating with the first sound output hole.

12. The mobile device according to claim 9, wherein the middle frame has a second groove on one side, the second sound outlet is located at one end of the second groove, the second sound output hole is located at the other end of the second groove, and the second sound outlet and the second sound output hole are communicated through a second sound source propagation channel of the second groove.

13. The mobile device according to claim 12, further comprising a second decorative hood, wherein the second decorative hood is provided on one side of the middle frame and located above the second sound output hole, and has a plurality of second holes communicating with the second sound output hole.

14. A mobile device, comprising the receiver apparatus according to claim 1.

15. The mobile device according to claim 14, wherein the mobile device has a main board cover and a middle frame, the two-way sound output receiver apparatus is provided between the main board cover and the middle frame, one of the first sound outlet and the second sound outlet communicates with a first sound output hole of the main board cover, and the other of the first sound outlet and the second sound outlet communicates with a second sound output hole of the middle frame.

16. The mobile device according to claim 15, wherein the first sound outlet communicates with the first sound output hole, the second sound outlet communicates with the second sound output hole, the main board cover has a first groove on one side, the first sound outlet is located at one end of the first groove, the first sound output hole is located at the other end of the first groove, and the first sound outlet and the first sound output hole are communicated through a first sound source propagation channel of the first groove.

17. The mobile device according to claim 16, further comprising a first decorative hood, wherein the first decorative hood is provided on one side of the main board cover and located above the first sound output hole, and has a plurality of first holes communicating with the first sound output hole.

18. The mobile device according to claim 15, wherein the middle frame has a second groove on one side, the second sound outlet is located at one end of the second groove, the second sound output hole is located at the other end of the second groove, and the second sound outlet and the second sound output hole are communicated through a second sound source propagation channel of the second groove.

19. The mobile device according to claim 18, further comprising a second decorative hood, wherein the second decorative hood is provided on one side of the middle frame and located above the second sound output hole, and has a plurality of second holes communicating with the second sound output hole.

* * * * *